(12) United States Patent
Akanuma et al.

(10) Patent No.: US 9,306,429 B2
(45) Date of Patent: Apr. 5, 2016

(54) VIBRATION GENERATOR HAVING DAMPING MEMBERS FOR A VIBRATING BODY AND LEAF SPRING

(71) Applicant: NIDEC SEIMITSU CORPORATION, Ueda, Nagano-ken (JP)

(72) Inventors: Tomohiro Akanuma, Ueda (JP); Yuuki Yamada, Ueda (JP); Tetsuya Inoue, Ueda (JP)

(73) Assignee: NIDEC SEIMITSU CORPORATION, Ueda-shi (JP)

( * ) Notice: Subject to any disclaimer, the term of this patent is extended or adjusted under 35 U.S.C. 154(b) by 555 days.

(21) Appl. No.: 13/765,293

(22) Filed: Feb. 12, 2013

(65) Prior Publication Data

US 2013/0241321 A1    Sep. 19, 2013

(30) Foreign Application Priority Data

Mar. 16, 2012  (JP) .................................. 2012-060187

(51) Int. Cl.
*H02K 5/24*  (2006.01)
*H02K 33/00*  (2006.01)
*H02K 33/16*  (2006.01)
(Continued)

(52) U.S. Cl.
CPC  *H02K 5/24* (2013.01); *B06B 1/045* (2013.01); *H02K 33/00* (2013.01); *H02K 33/16* (2013.01); *H02K 5/04* (2013.01); *H02K 35/00* (2013.01)

(58) Field of Classification Search
CPC ............ B06B 1/045; H02K 5/04; H02K 5/24; H02K 33/00; H02K 33/16; H02K 35/00
USPC ............ 310/12.16, 15, 16, 23, 25, 28, 51, 81, 310/91; 335/185, 19, 193
See application file for complete search history.

(56) References Cited

U.S. PATENT DOCUMENTS 8,288,898 B2 *  10/2012  Jun et al. .......................... 310/13
8,456,042 B2 *  6/2013  Dong et al. ...................... 310/15
(Continued)

FOREIGN PATENT DOCUMENTS

CN  201388144 Y  1/2010
CN  201708677 U  1/2011
(Continued)

OTHER PUBLICATIONS

T. Akanuma et al., "Vibration Generator", Nidec Seimitsu Corporation, Jan. 25, 2013, U.S. Appl. No. 13/750,534.
(Continued)

*Primary Examiner* — Hanh Nguyen
*Assistant Examiner* — Rashad Johnson
(74) *Attorney, Agent, or Firm* — Westerman, Hattori, Daniels & Adrian, LLP

(57) ABSTRACT

A vibration generator includes a circumferential wall portion, a vibrating body arranged inside the circumferential wall portion in an opposing relationship with a coil and configured to reciprocatingly vibrate in one direction, a band-shaped leaf spring arranged between the vibrating body and the circumferential wall portion to support the vibrating body on the circumferential wall portion, and a damper member including a base portion attached to one of the vibrating body and the leaf spring and a tip end portion extending toward the other of the vibrating body and the leaf spring. The tip end portion of the damper member makes sliding contact with the leaf sprig or the vibrating body.

11 Claims, 9 Drawing Sheets

(51) Int. Cl.
  *B06B 1/04* (2006.01)
  *H02K 5/04* (2006.01)
  *H02K 35/00* (2006.01)

(56) References Cited

U.S. PATENT DOCUMENTS

| | | | |
|---|---|---|---|
| 8,575,794 B2* | 11/2013 | Lee et al. | 310/15 |
| 2009/0096299 A1* | 4/2009 | Ota et al. | 310/25 |
| 2009/0267423 A1* | 10/2009 | Kajiwara et al. | 310/36 |
| 2010/0213773 A1 | 8/2010 | Dong et al. | |
| 2011/0001365 A1* | 1/2011 | Park | H02K 33/16 310/17 |
| 2011/0006618 A1* | 1/2011 | Lee | B06B 1/045 310/25 |
| 2011/0018364 A1* | 1/2011 | Kim | H02K 33/18 310/17 |
| 2011/0018365 A1* | 1/2011 | Kim | B06B 1/045 310/17 |
| 2011/0018367 A1* | 1/2011 | Kim | B06B 1/045 310/25 |
| 2011/0062803 A1* | 3/2011 | Lee | H02K 33/18 310/29 |
| 2011/0089772 A1 | 4/2011 | Dong et al. | |
| 2011/0127858 A1* | 6/2011 | Park | 310/25 |
| 2011/0169347 A1 | 7/2011 | Miyamoto et al. | |
| 2011/0280433 A1* | 11/2011 | Park | 381/433 |
| 2011/0316361 A1* | 12/2011 | Park | H02K 33/16 310/25 |
| 2012/0049660 A1* | 3/2012 | Park | 310/25 |
| 2012/0169148 A1* | 7/2012 | Kim | H02K 33/18 310/25 |
| 2012/0187780 A1* | 7/2012 | Bang et al. | 310/25 |
| 2013/0099602 A1* | 4/2013 | Park et al. | 310/25 |

FOREIGN PATENT DOCUMENTS

| | | |
|---|---|---|
| CN | 102143808 A | 8/2011 |
| JP | 2002-200460 A | 7/2002 |
| JP | 2002-263577 A | 9/2002 |
| JP | 2010-179295 A | 8/2010 |
| WO | 2010/026883 A1 | 3/2010 |

OTHER PUBLICATIONS

T. Akanuma et al., "Vibration Generator", Nidec Seimitsu Corporation, Jan. 24, 2013, U.S. Appl. No. 13/748,972.

* cited by examiner

VIBRATION GENERATOR HAVING DAMPING MEMBERS FOR A VIBRATING BODY AND LEAF SPRING

BACKGROUND OF THE INVENTION

1. Field of the Invention

The present invention relates to a vibration generator for use in a portable terminal or the like. More specifically, the present invention pertains to a vibration generator in which a vibrating body reciprocatingly vibrated by magnetic fields is supported by a leaf spring.

2. Description of the Related Art

A portable terminal such as a cellular phone or the like includes a vibration generator capable of notifying a user of arrival of an incoming call. Different types of vibration generators have heretofore been developed.

Japanese Patent Application Publication No. 2002-263557 (JP2002-263557A) discloses a vibration generator which includes a weight attached to an output shaft of a motor in an off-centered state. The vibration generator generates vibration as the motor makes rotation.

Japanese Patent Application Publication No. 2002-200460 (JP2002-200460A) discloses a technology on a vibration actuator. The vibration actuator includes a fixing portion. The vibration actuator includes a plurality of magnets and a vibrating body having a yoke for closing the magnetic fluxes generated by the magnets. The vibration actuator further includes a plurality of elastic members for movably holding the vibrating body in the fixing portion. The vibration actuator further includes a coil interlinking with the magnetic fluxes generated by the magnets. If an electric current flows through the coil, the coil generates a thrust force between the fixing portion and the vibrating body so that the vibrating body can vibrate in a specified vibration direction. In respect of the technology disclosed in JP2002-200460A, there is a demand to prevent generation of noises otherwise generated due to the severe vibration of the vibrating body. Moreover, a demand to rapidly stop the vibrating body exists in the technology disclosed in JP2002-200460A.

In order to comply with these demands, Japanese Patent Application Publication No. 2010-179295 (JP2010-179295A) discloses a technology in which vibration-proof materials made of silicon resin, urethane resin, fluorine resin, acryl, a-gel or the like are arranged at the opposite sides of a vibrating body, thereby damping the vibration of the vibrating body (see paragraph 0067 of JP2010-179295A).

In addition to the technology disclosed in JP2010-179295A, there is generally available a technology in which fluid such as grease or magnetic fluid is filled into a vibration generator. The resistance of the fluid is used to prevent undue vibration of a vibrating body or to rapidly stop the vibrating body.

In case of the technology disclosed in JP2002-263557A, it is however difficult to manufacture a motor having a stably low Q value (amplitude increasing coefficient). Accordingly, the technology disclosed in JP2002-263557A involves difficulties in improving vibration frequency characteristics and suppressing undue vibration of the vibrating body.

In case of the technology disclosed in JP2010-179295A, the vibration-proof materials are degraded over time, as a result of which the elasticity of the vibration-proof materials gets reduced. This is a cause of generating noises.

In the solution means in which the fluid such as grease or magnetic fluid is filled into the vibration generator, if the viscosity of the fluid is low, it is impossible to apply a resistance to the vibrating body. This makes it difficult to suppress undue vibration of the vibrating body. In contrast, if the viscosity of the fluid is too high, the fluid impedes the vibration of the vibrating body, consequently reducing the vibration generating characteristics of the vibration generator. In case where the fluid is used, the viscosity of the fluid varies with the change in the temperature of the vibration generator. This leads to a change in the resistance against the vibrating body. Moreover, if the fluid is used, the fluid is scattered as the vibrating body makes vibration. This poses a problem in that a Q value undergoes a change.

SUMMARY OF THE INVENTION

The present invention copes with the problems noted above. The present invention provides a vibration generator which is superior in vibration characteristics and which is capable of effectively preventing undue vibration of a vibrating body and preventing generation of noises.

The vibration generator of the present invention is provided to achieve the above object. The vibration generator of the present invention includes a circumferential wall portion; a vibrating body arranged inside the circumferential wall portion in an opposing relationship with a coil and configured to reciprocatingly vibrate in one direction; a band-shaped leaf spring arranged between the vibrating body and the circumferential wall portion to support the vibrating body on the circumferential wall portion; and a damper member having a base portion attached to one of the vibrating body and the leaf spring and a tip end portion extending toward the other of the vibrating body and the leaf spring. The tip end portion of the damper member makes sliding contact with the leaf spring or the vibrating body.

The vibration generator of the present invention is capable of preventing undue vibration of the vibrating body because the damper member is arranged between the vibrating body and the leaf spring. In addition, the vibration generator of the present invention is capable of rapidly stopping the vibrating body because the damper member is arranged between the vibrating body and the leaf spring.

In the vibration generator of the present invention, a contact area of the tip end portion of the damper member and the leaf spring or the vibrating body varies with vibration of the vibrating body.

In the vibration generator of the present invention, the contact area of the tip end portion of the damper member and the leaf spring or the vibrating body is increased when the leaf spring is deformed along with the vibration of the vibrating body. In the vibration generator of the present invention, it is therefore possible to appropriately transfer the action of the damper member to the leaf spring without locally applying a large force to the leaf spring.

The leaf spring of the vibration generator of the present invention includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body. The connection portion and the attachment portion are arranged to interpose the vibrating body therebetween in a direction intersecting a vibration direction of the vibrating body. The connection portion is arranged at one transverse side of the vibrating body. The attachment portion is arranged at the other transverse side of the vibrating body. The intermediate portion is arranged outward of the vibrating body in the vibration direction to extend across the vibration direction. The damper member is arranged between a side portion of the vibrating body positioned at the other transverse side of the vibrating body and the intermediate portion of the leaf spring.

According to the present invention, it is possible to reduce stresses generated in the leaf spring and to prolong the lifespan of the vibration generator. It is also possible to increase the space defined inside the leaf spring and to increase the vibration direction dimension of the vibrating body or to increase the amplitude of the vibrating body. If the vibrating body is formed into a large size or if the amplitude of the vibrating body is increased, the vibrating body tends to make undue vibration. However, the provision of the damper member makes it possible to prevent generation of the undue vibration.

In the vibration generator of the present invention, the leaf spring is converted to a non-linear characteristic spring by the damper member.

In the vibration generator of the present invention, if the vibrating body is moved to near the maximum amplitude in the vibration direction, the leaf spring is deformed. As a result, the resilient force of the damper member acts against the leaf spring. For that reason, the leaf spring of the vibration generator of the present invention becomes a spring having a non-linear vibration characteristic. In the vibration generator of the present invention, the vibrating body is supported by the leaf spring as a spring having a non-linear vibration characteristic. It is therefore possible to shift the resonance point of the leaf spring to a high frequency value. Thus, the change rate of the acceleration with respect to the frequency until the acceleration reaches the resonance point becomes gentle and the value of the acceleration at the resonance point gets reduced. For that reason, the leaf spring of the vibration generator of the present invention can prevent undue vibration of the vibrating body by applying only the acceleration smaller than the acceleration at which the vibrating body makes undue vibration. Since the change rate of the acceleration until the leaf spring reaches the resonance point becomes gentle, it is possible to widen the frequency range in which the vibrating body vibrates at a desired acceleration.

In the vibration generator of the present invention, the leaf spring is made of a metallic material. The vibrating body is configured to vibrate at a frequency close to a resonance frequency of the leaf spring. The damper member has a spring constant smaller than a spring constant of the leaf spring.

Since the leaf spring is made of a metallic material in the vibration generator of the present invention, the resonance frequency of the leaf springs become clear. This makes it possible to easily form a vibration generator in which a resonance phenomenon occurs. Since the damper member has a spring constant smaller than a spring constant of the leaf spring in the vibration generator of the present invention, the damper member does not impede the vibration of the vibrating body. Accordingly, the vibrating body of the vibration generator of the present invention does not make any undue vibration but vibrates at a desired level of acceleration.

In the vibration generator of the present invention, the damper member has a resonance frequency equal to or smaller than 1/10 of a resonance frequency of the leaf spring.

Thus, the vibration generator of the present invention can cause the vibrating body to reliably vibrate at a suitable level of acceleration.

The leaf spring of the vibration generator of the present invention includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body. The connection portion and the attachment portion are arranged to interpose the vibrating body therebetween in a direction intersecting a vibration direction of the vibrating body. The connection portion is arranged at one transverse side of the vibrating body. The attachment portion is arranged at the other transverse side of the vibrating body. The intermediate portion is arranged outward of the vibrating body in the vibration direction to extend across the vibration direction. The base portion of the damper member is attached to the vibrating body. The tip end portion of the damper member extends toward an inner surface of the attachment portion of the leaf spring.

The damper member of the vibration generator of the present invention does not impede the vibration of the vibrating body while the vibrating body makes vibration. The damper member of the vibration generator of the present invention can rapidly stop the vibration of the vibrating body when an electric current flowing through the coil is cut off to stop the vibration of the vibrating body.

The vibration generator of the present invention is capable of preventing undue vibration of a vibrating body and preventing generation of noises. Moreover, the vibration generator of the present invention is capable of rapidly stopping vibration of a vibrating body.

DETAILED DESCRIPTION OF THE INVENTION

Figure 1:
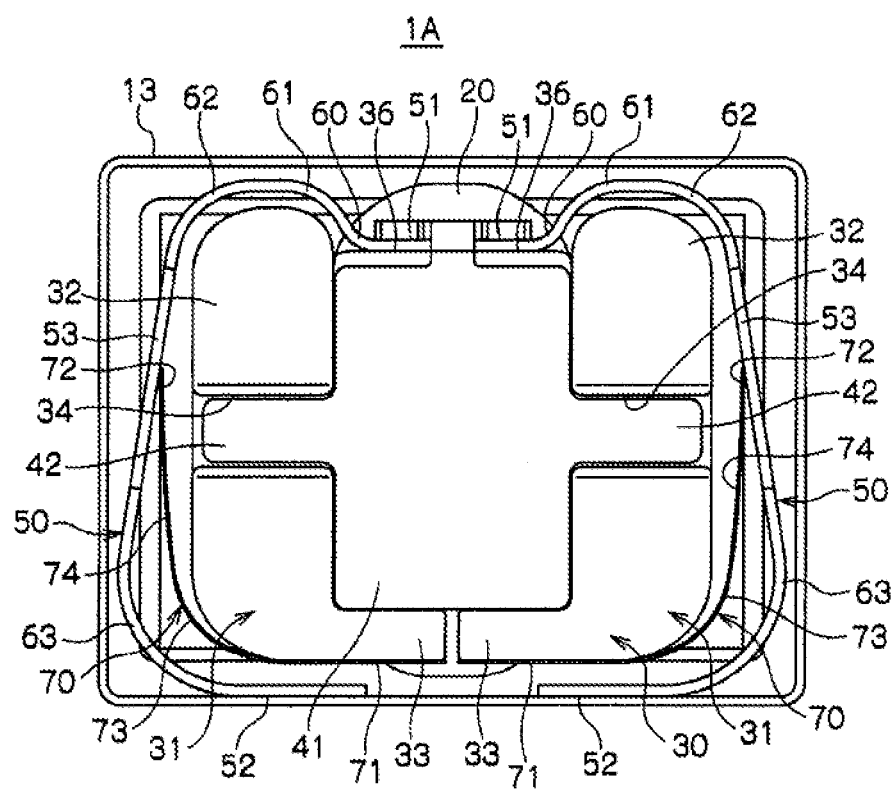
FIG. 1 is a plan view showing the internal structure of a vibration generator according to a first preferred embodiment of the present invention.

Preferred embodiments of the present invention will now be described with reference to the accompanying drawings. The technical scope of the present invention is not limited to the following description and the accompanying drawings.

First, description will be made on the basic configuration of a vibration generator 1A or 1B of the present invention.

A vibration generator 1A or 1B according to the present invention is arranged within a portable terminal such as a cellular phone or the like. The vibration generator 1A or 1B includes a circumferential wall portion 13 surrounding the periphery of the vibration generator 1A or 1B; a vibrating body 30 arranged inside the circumferential wall portion 13 in an opposing relationship with a coil 20 and configured to reciprocatingly vibrate in one direction; a band-shaped leaf spring 50 arranged between the vibrating body 30 and the circumferential wall portion 13 to have the vibrating body 30 supported on the circumferential wall portion 13; and a damper member 70 or 80 arranged between the vibrating body 30 and the leaf spring 50. The damper member 70 or 80 includes a base portion 71 or 81 attached to one of the vibrating body 30 and the leaf spring 50 and a tip end portion 72 or 82 extending toward the other of the vibrating body 30 and the leaf spring 50. The tip end portion 72 or 82 of the damper member 70 or 80 makes sliding movement with respect to the leaf spring 50 or the vibrating body 30.

The vibration generator 1A or 1B is capable of generating a suitable level of vibration in the vibrating body 30, preventing undue vibration of the vibrating body 30 and effectively preventing generation of noises in the vibration generator 1A or 1B. The vibration generator 1A or 1B is capable of rapidly stopping vibration of the vibrating body 30.

The vibration generator 1A is a vibration generator according to a first preferred embodiment shown in FIGS. 1 through 7. The vibration generator 1B is a vibration generator according to a second preferred embodiment shown in FIGS. 8 and 9. The present invention will now be described on an embodiment-by-embodiment basis.

First Preferred Embodiment

The basic configuration of the vibration generator 1A according to the first preferred embodiment of the present invention is as follows.

Figure 2:
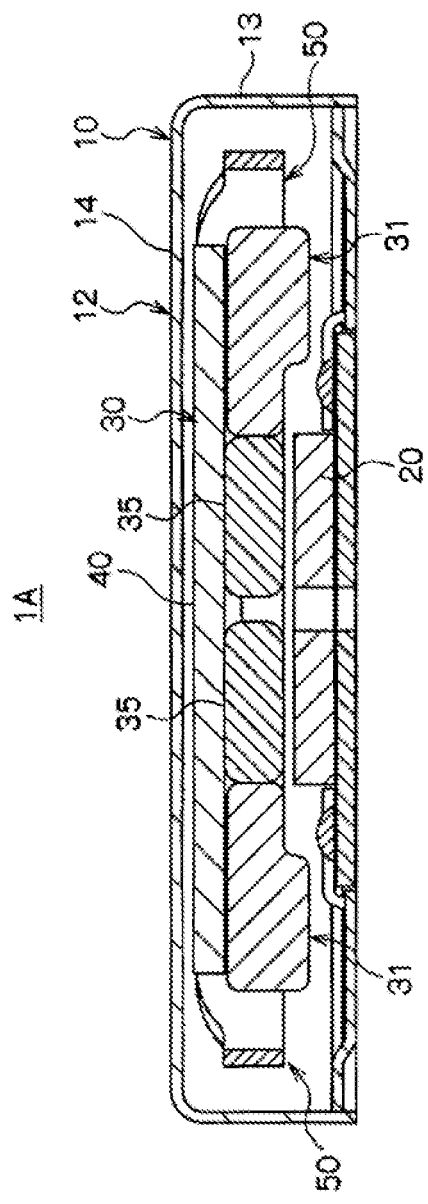
FIG. 2 is a vertical section view of the vibration generator shown in FIG. 1.
Figure 3:
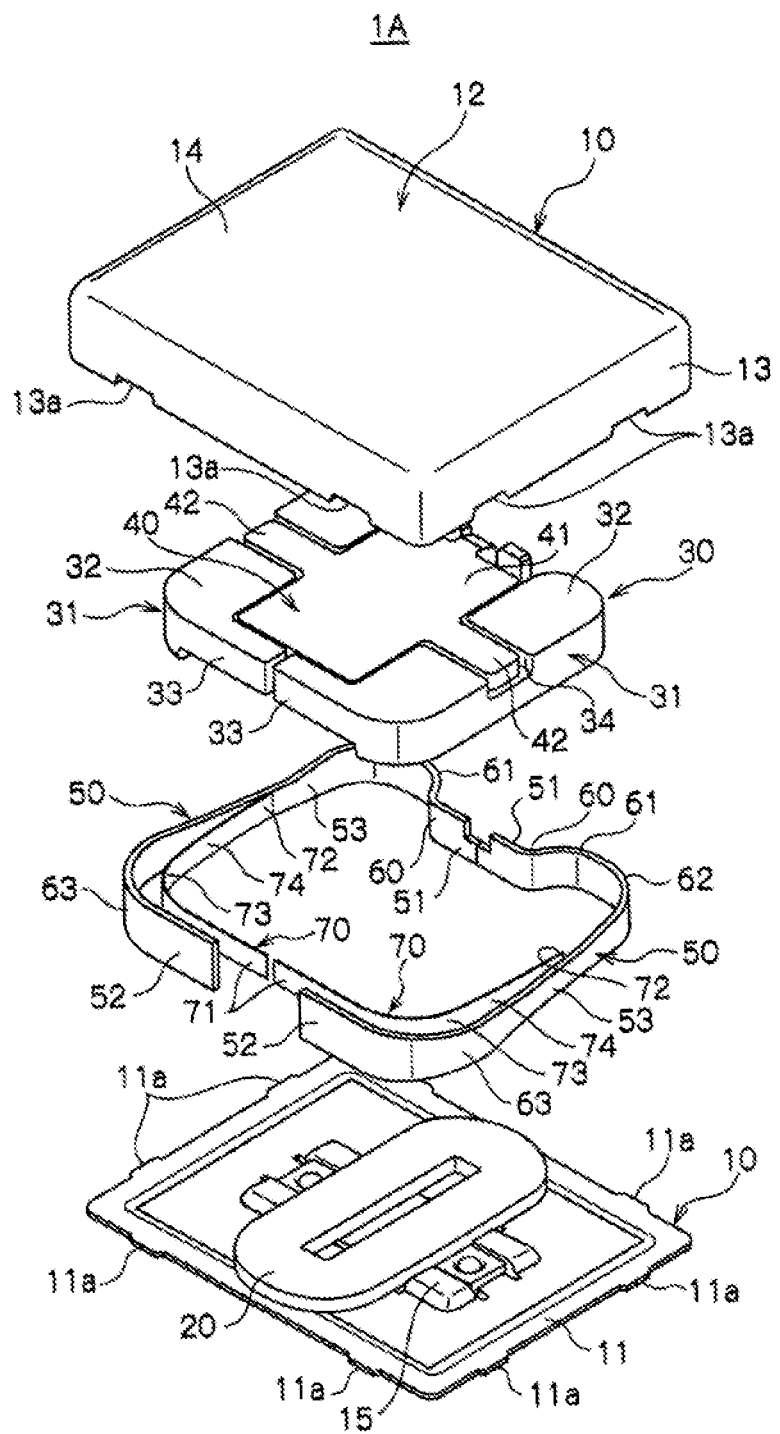
FIG. 3 is an exploded perspective view of the vibration generator shown in FIG. 1.

Referring to FIGS. 1 through 3, the vibration generator 1A preferably includes a housing 10 making up an outer shell. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is positioned on the bottom member 11. A vibrating body 30 is arranged within the housing 10 in an opposing relationship with the coil 20. Band-shaped leaf springs 50 for supporting the vibrating body 30 with respect to the circumferential wall portion 13 are arranged within the housing 10.

The coil 20 is a hollow-core spiral coil formed by spirally winding a wire so that a space can be defined in the central region thereof. The vibrating body 30 is formed to have, e.g., a rectangular contour or a substantially rectangular contour. The vibrating body 30 reciprocatingly vibrates in one direction between the coil 20 and the top portion 14 of the case 12 under the interaction of the magnetic fields generated by itself and the magnetic fields generated by the coil 20 arranged on the bottom member 11.

The leaf springs 50 are arranged in pair. The leaf springs 50 are arranged at the vibration-direction opposite sides of the vibrating body 30 and are positioned between the vibrating body 30 and the circumferential wall portion 13 of the case 12, thereby supporting the vibrating body 30 on the circumferential wall portion 13. Each of the leaf springs 50 preferably includes a connection portion 51 connected to the vibrating body 30 at one longitudinal end thereof, an attachment portion 52 attached to the circumferential wall portion 13 at the other longitudinal end thereof and an intermediate portion 53 formed between the connection portion 51 and the attachment portion 52 to extend around the vibrating body 30. The connection portion 51 and the attachment portion 52 of each of the leaf springs 50 are arranged at one transverse side and the other transverse side of the vibrating body 30 along a direction intersecting the vibration direction of the vibrating body 30, with the vibrating body 30 interposed between the connection portion 51 and the attachment portion 52. The intermediate portion 53 of each of the leaf springs 50 is arranged outward of the vibrating body 30 to extend across the vibration direction of the vibrating body 30. Damper members 70 are arranged between the vibrating body 30 and the leaf springs 50.

The damper members 70 are band-shaped members. Each of the damper members 70 preferably includes a base portion 71 attached to the vibrating body 30 and a tip end portion 72 extending toward the intermediate portion 53 of each of the leaf springs 50. In the vibration generator 1A of the present invention, the vibration characteristics of the leaf springs 50 are made non-linear by arranging the damper members 70.

The respective components of the present invention will be described in more detail with reference to FIGS. 1 through 3.

As shown in FIGS. 1 through 3, the housing 10 makes up an outer shell of the vibration generator 1A. The housing 10 is formed into, e.g., a flat rectangular parallelepiped shape with a reduced height.

The housing 10 is made of a non-magnetic material. The housing 10 preferably includes a flat bottom member 11 formed into, e.g., a rectangular shape or a substantially rectangular shape and a case 12 capped on the bottom member 11. The case 12 preferably includes a circumferential wall portion 13 extending along the peripheral edge of the case 12 and a top portion 14 closing the top end of the case 12.

As shown in FIG. 3, the bottom member 11 has positioning protrusions 11a protruding outward from two points of each of four sides of the bottom member 11 defining the peripheral edge of the bottom member 11. The case 12 has recesses 13a formed on a lower surface of the circumferential wall portion 13 in a corresponding relationship with the positioning protrusions 11a. The positioning protrusions 11a are inserted into the recesses 13a. The bottom member 11 and the case 12 can be assembled together by inserting the positioning protrusions 11a of the bottom member 11 into the recesses 13a of the circumferential wall portion 13. The bottom member 11 has a coil holder 15 formed in the central region thereof. The coil 20 is held by the coil holder 15.

The coil 20 is a hollow-core spiral coil formed by spirally winding a current-flowing wire so that a space can be defined in the central region thereof. The coil 20 is formed into, e.g., an elliptical shape or a substantially elliptical shape such that the longitudinal dimension thereof becomes longer than the transverse dimension thereof. The coil 20 is held by the coil holder 15 with the longitudinal direction thereof running orthogonal to the vibration direction of the vibrating body 30.

As shown in FIG. 2, the vibrating body 30 is arranged parallel to the coil 20 with a gap left between the vibrating body 30 and the upper surface of the coil 20, and is supported by the leaf springs 50. The vibrating body 30 is formed to have, e.g., a rectangular overall shape or a substantially rectangular overall shape. The vibrating body 30 preferably includes a pair of weights 31 arranged at the longitudinal opposite sides of the vibrating body 30, a pair of magnets 35 arranged inside the weights 31 and a cover 40 covering the magnets 35 from above. The weights 31, the magnets 35 and the cover 40 are one-piece formed with one another.

Each of the weights 31 preferably includes a lateral weight portion 32 arranged in a vibration-direction outer region and a central weight portion 33 arranged at the side of the attachment portion 52 in a direction intersecting the vibration direction to extend from the lateral weight portion 32 toward the center of the vibrating body 30. Each of the weights 31 is formed into a substantially L-like shape by the lateral weight portion 32 and the central weight portion 33. The respective weights 31 are arranged in a symmetrical relationship with respect to the longitudinal center of the vibrating body 30. The tip ends of the central weight portions 33 extending in the longitudinal direction are opposed to each other. Since the respective weights 31 are symmetrically arranged while maintaining a left and right balance, the vibrating body 30 can vibrate smoothly. Each of the lateral weight portions 32 has a transversely-extending fitting groove 34 formed on the upper surface thereof. As shown in FIG. 2, the lateral weight portion 32 of each of the weights 31 is arranged more outwardly than the outer peripheral portion of the coil 20 in the vibration direction of the vibrating body 30.

Each of the magnets 35 is formed into, e.g., a rectangular parallelepiped shape. The magnets 35 are arranged side by side between the weights 31 with the longitudinal direction thereof oriented in the transverse direction of the vibrating body 30. The magnets 35 are arranged in a well-balanced manner so as to become symmetrical with respect to the longitudinal center of the vibrating body 30.

The cover 40 is made of a magnetic material. The cover 40 preferably includes a body portion 41 covering the arrangement region of the magnets 35 from above. The cover 40 preferably further includes arm portions 42 extending outward from the left and right sides of the body portion 41. The arm portions 42 are fitted to the fitting grooves 34 of the respective weights 31.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the longitudinal center of the vibrating body 30 in a symmetrical relationship with each other.

The vibrating body 30 is supported by the leaf springs 50 with the longitudinal direction thereof oriented in a direction orthogonal to the longitudinal direction of the coil 20. The vibrating body 30 is reciprocatingly vibrated in the longitudinal direction of the vibrating body 30 by virtue of the interaction of the magnetic fields generated by the coil 20 and the magnetic fields generated by the magnets 35.

The leaf springs 50 are formed by a metallic material such as spring steel or the like into, e.g., an elongated band shape. Each of the leaf springs 50 is arranged at each of the longitudinal opposite sides of the vibrating body 30. Each of the leaf springs 50 preferably includes a connection portion 51 connected to the vibrating body 30 at one longitudinal end thereof, an attachment portion 52 attached to the inner surface of the circumferential wall portion 13 of the case 12 at the other longitudinal end thereof and an intermediate portion 53 formed between the connection portion 51 and the attachment portion 52. The intermediate portion 53 of each of the leaf springs 50 preferably includes a plurality of curved sections 60, 61, 62 and 63 at which each of the leaf springs 50 extends in a curved shape.

The connection portion 51 and the attachment portion 52 are arranged along a direction intersecting the vibration direction of the vibrating body 30. The connection portion 51 and the attachment portion 52 are arranged at one transverse side and the other transverse side of the vibrating body 30 interposed therebetween. The connection portion 51 is connected to the vibrating body 30 at one transverse side of the vibrating body 30. The attachment portion 52 is attached to the circumferential wall portion 13 at the other transverse side of the vibrating body 30. The connection portion 51 is formed by linearly extending one end of each of the leaf springs 50 and is bonded to one of the seat surfaces 36 of the vibrating body 30. In one transverse side region where the connection portion 51 is arranged, each of the leaf springs 50 is formed by three curved sections 60, 61 and 62 so as to protrude away from the vibrating body 30 toward the circumferential wall portion 13.

The intermediate portion 53 extends from the connection portion 51 toward the attachment portion 52 around the vibrating body 30. The intermediate portion 53 is positioned in the longitudinal outside region of the vibrating body 30 to extend across the vibration direction of the vibrating body 30. In the longitudinal outside region of the vibrating body 30, each of the leaf springs 50 is obliquely formed to go away from the vibrating body 30 and come close to the circumferential wall portion 13 as each of the leaf springs 50 extends from one transverse side region to the other transverse side region where the attachment portion 52 is positioned. In the extent from the longitudinal outside region of the vibrating body 30 to the attachment portion 52, due to the existence of the curved section 63, each of the leaf springs 50 is largely curved to extend toward the central region of the vibrating body 30.

The attachment portion 52 is formed by linearly extending the other end of each of the leaf springs 50 and is bonded to the circumferential wall portion 13 of the case 12.

It may be possible to employ a leaf spring formed into an one-piece member. In order to form an one-piece leaf spring, the leaf springs arranged at the opposite longitudinal sides of the vibrating body 30 may be formed into an one-piece member by interconnecting the connection portions 51 thereof or by interconnecting the attachment portions 52 thereof. If a leaf spring is formed into an one-piece member, it becomes possible to reduce the number of components of the vibration generator 1A. Along with the reduction in the number of components of the vibration generator 1A, it is possible to easily perform an assembling process and to reduce the manufacturing cost. The fixing strength and the accuracy of a leaf spring can be increased by forming the leaf spring into an one-piece member.

Each of the damper members 70 is an elastic member formed by a resin or the like into a band shape. The damper members 70 have a spring constant smaller than a spring constant of the leaf springs 50. The material of the damper members 70 is not limited to a resin as long as the spring constant of the damper members 70 is smaller than the spring constant of the leaf springs 50. It is preferred that a material capable of making smooth sliding movement with respect to the leaf springs 50 be selected as the material of the damper members 70. The resonance frequency of the damper members 70 of the vibration generator 1A needs to be smaller than the resonance frequency of the leaf springs 50. The resonance frequency of the damper members 70 of the vibration generator 1A may preferably be $1/10$ or less of the resonance frequency of the leaf springs 50. The resonance frequency of the damper members 70 is not particularly limited as long as it is equal to or smaller than $1/10$ of the resonance frequency of the leaf springs 50.

The damper members 70 of the vibration generator 1A are arranged in a corresponding relationship with the two leaf springs 50. Since the base portion 71 of each of the damper members 70 is attached to the vibrating body 30 with the tip end portion 72 thereof extending toward the intermediate portion 53 of each of the leaf springs 50, the damper members 70 are arranged in such a state that the other transverse side portion of the vibrating body 30 where the attachment portions 52 of the leaf springs 50 exist is connected to the intermediate portions 53 of the leaf springs 50 by the damper members 70.

The base portions 71 of the damper members 70 extend linearly and are bonded by an adhesive agent or the like to the other transverse side portion of the vibrating body 30 (one of the four side portions of the vibrating body 30) where the attachment portions 52 of the leaf springs 50 are arranged. The base portions 71 are bonded to the vibrating body 30 in the symmetrical positions shifted outward from the center of the vibrating body 30 in the vibration direction. In the damper members 70, the tip end portions 72 extend more outward of the vibrating body 30 than the base portions 71. Each of the damper members 70 has a portion 73 adjoining the vibrating body 30. The portion 73 is curved toward one transverse side region where the connection portion 51 of each of the leaf springs 50 is arranged. Each of the damper members 70 has a portion 74 linearly extending from the portion 73 adjoining the vibrating body 30 to the tip end portion 72. The portion 74 is arranged inside the intermediate portion 53 of each of the leaf springs 50 to obliquely extend with respect to the intermediate portion 53. The tip end portion 72 of each of the damper members 70 makes sliding contact with the inner surface of the intermediate portion 53 of each of the leaf springs 50. Thus, the contact area of the tip end portions 72 of the damper members 70 and the leaf springs 50 is changed as the vibrating body 30 vibrates.

The damper members 70 of the vibration generator 1A changes the vibration characteristics of the leaf springs 50 inasmuch as the contact area of the tip end portions 72 of the damper members 70 and the leaf springs 50 varies with the vibration of the vibrating body 30. More specifically, when the vibrating body 30 is positioned near the center in the vibration direction, the leaf springs 50 are not given a load and are kept in a non-deformed state. In this state, the leaf springs 50 receive small forces from the damper members 70. For that reason, the vibration characteristics of the leaf springs 50 are similar to the characteristics of a linear characteristic spring in which the load-deflection relationship is changed linearly. In this state, even if the contact area of the tip end portions 72 of the damper members 70 and the leaf springs 50 is small, the damper members 70 do not locally apply any unnecessary force to the leaf springs 50.

In contrast, the leaf springs 50 undergo deformation if the amplitude of the vibrating body 30 grows larger due to the vibration of the vibrating body 30 in one vibration direction. In this state, the leaf springs 50 receive large forces from the damper members 70. For that reason, the vibration characteristics of the leaf springs 50 become similar to the characteristics of a non-linear characteristic spring in which the load-deflection relationship is not linearly changed. In this state, the contact area of the tip end portions 72 of the damper members 70 and the leaf springs 50 grows larger, thereby preventing the leaf springs 50 from locally receiving forces from the damper members 70.

If the leaf springs 50 becomes non-linear characteristic springs under the action of the damper members 70, the resonance points of the leaf springs 50 are deviated from each other and the acceleration peak is reduced. Thanks to this action, the vibrating body 30 supported on the leaf springs 50 is prevented from making undue vibration.

Figure 4:
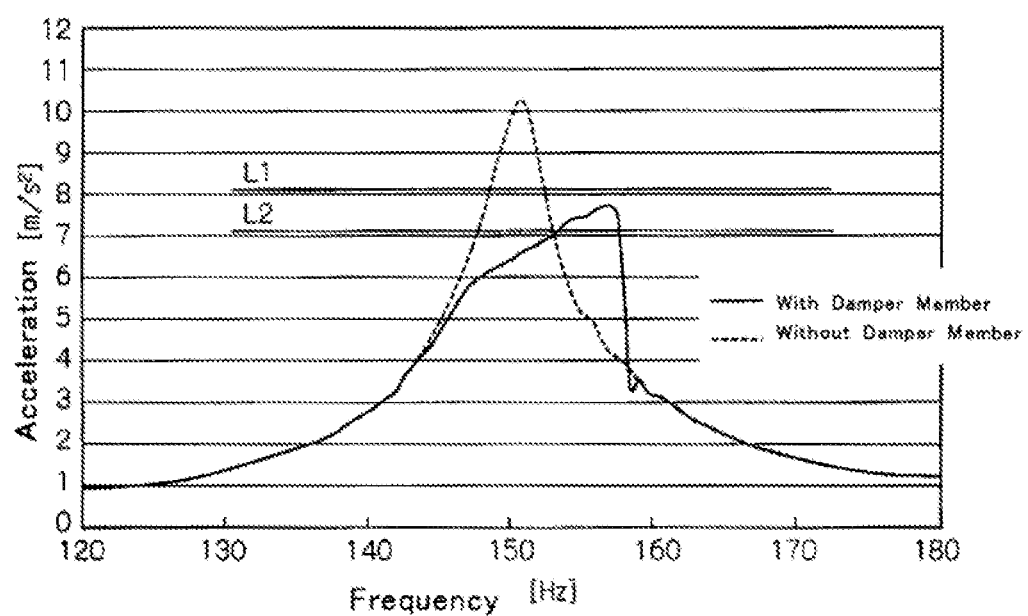
FIG. 4 is a graph representing the relationship between the frequency and the acceleration of a vibrating body in case of existence and absence of a damper member.
Figure 5:
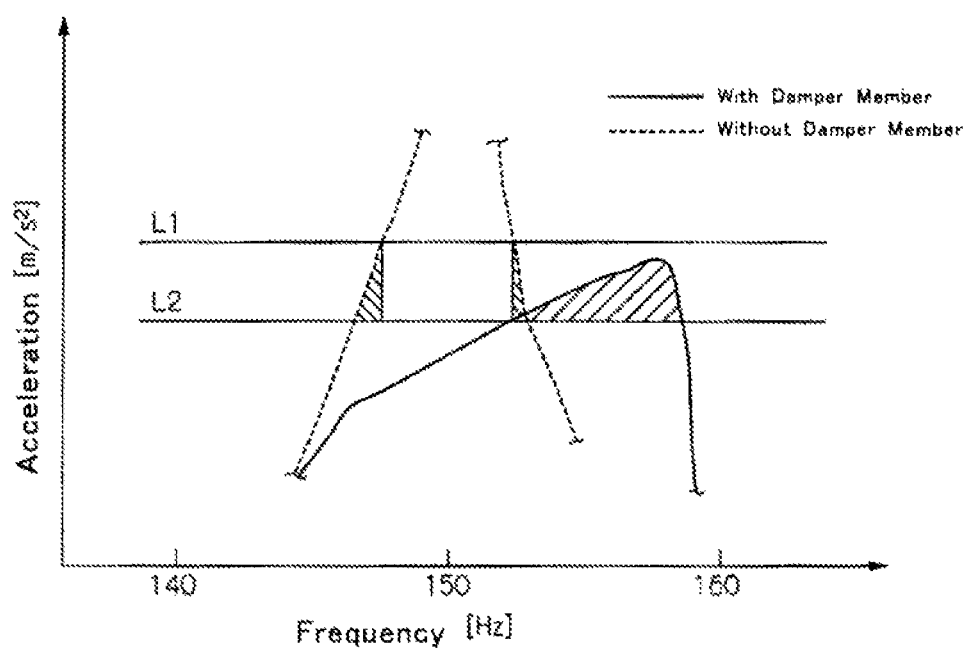
FIG. 5 is a graph representing the relationship between the frequency and the acceleration of a vibrating body in an effectively usable frequency range in case of existence and absence of a damper member.

The graphs shown in FIGS. 4 and 5 illustrate how to prevent undue vibration of the vibrating body 30 by the provision of the damper members 70.

FIG. 4 is a graph representing the relationship between the frequency and the acceleration of the vibrating body 30 in case where the vibrating body 30 is supported by only the leaf springs 50 and in case where the vibrating body 30 is supported by the leaf springs 50 through the damper members 70. In the graph, the horizontal axis indicates the frequency of the vibrating body 30. The vertical axis indicates the acceleration of the vibrating body 30. In the graph, the solid-line curve indicates the case where the damper members 70 are provided. The dot-line curve indicates the case where the damper members 70 are not provided and the vibrating body 30 is supported by only the leaf springs 50. Two horizontal lines L1 and L2 shown in the graph indicate the upper and lower limits of the acceleration of the vibration to be generated by the vibration generator 1A. The lower limit acceleration is about 7 $m/s^2$ and the upper limit acceleration is about 8 $m/s^2$. If the acceleration is smaller than the lower limit L2, the vibration becomes weak. In case where the vibration generator generating only the weak vibration is employed in a portable terminal, it is sometimes impossible to appropriately notify a user of an incoming call. In contrast, if the acceleration is larger than the upper limit L1, the vibrating body 30 makes undue vibration and interferes with the leaf springs 50 or the housing 10, thereby generating noises in some cases. The region between L1 and L2 is a proper acceleration region where the vibration generator 1A generates moderate vibration.

In case where the vibrating body 30 is supported by only the leaf springs 50, as indicated by a dot line, the acceleration exceeds the lower limit L2 and reaches the proper region if the frequency has a substantially middle value between 140 Hz and 150 Hz. However, the acceleration exceeds the upper limit L1 if the frequency is a little smaller than 150 Hz. Then, the acceleration reaches a peak a little larger than 10 $m/s^2$ if the frequency is approximately 150 Hz. The acceleration returns to the proper region if the frequency is a little larger than 150 Hz. The acceleration descends beyond the lower limit L2 if the frequency has a substantially middle value between 150 Hz and 160 Hz. As can be noted from the above, in case where the vibrating body 30 is supported by only the leaf springs 50, undue vibration is generated if the frequency is around 150 Hz.

In case where the vibrating body 30 is supported by the leaf springs 50 through the damper members 70, as indicated by a solid line, the acceleration exceeds the lower limit L2 if the frequency has a substantially middle value between 150 Hz and 160 Hz. If the frequency is a little smaller than 160 Hz, the acceleration reaches a peak which is smaller than the upper limit L1. Upon passing through the peak, the acceleration is sharply reduced beyond the lower limit L2. As can be noted from the above, in case where the damper members 70 are arranged, it is possible to increase the frequency value at which resonance is generated. It is also possible to reduce the acceleration value at the resonance point, thereby preventing generation of undue vibration.

If the damper members 70 are arranged, it is possible to prevent generation of undue vibration and to widen the frequency region where the acceleration can be suppressed to the proper region. This is illustrated in FIG. 5. In FIG. 5, the horizontal axis indicates the frequency. The vertical axis indicates the acceleration. The dot-line curve indicates the case where the vibrating body 30 is supported by only the leaf springs 50. The solid-line curve indicates the case where the damper members 70 are arranged. The hatched portions indicate the frequency regions where the acceleration of the vibrating body 30 remains within the proper region.

As shown in FIG. 5, in case where the vibrating body 30 is supported by only the leaf springs 50, the frequency regions where the acceleration exists within the proper region are extremely narrow and are obtained when the frequency has a substantially middle value between 140 Hz and 150 Hz and when the frequency is larger than 150 Hz. In contrast, in case where the damper members 70 are arranged, the frequency region where the acceleration stays within the proper region is broad enough to extend from the frequency value of a little larger than 150 Hz to the frequency value of a little smaller than 160 Hz. As can be noted from the above, if the damper members 70 are arranged, it is possible to have the vibrating body 30 vibrate at a desired level of acceleration over a wide frequency region. This makes it possible to provide an easy-to-use vibration generator 1A.

Figure 6:
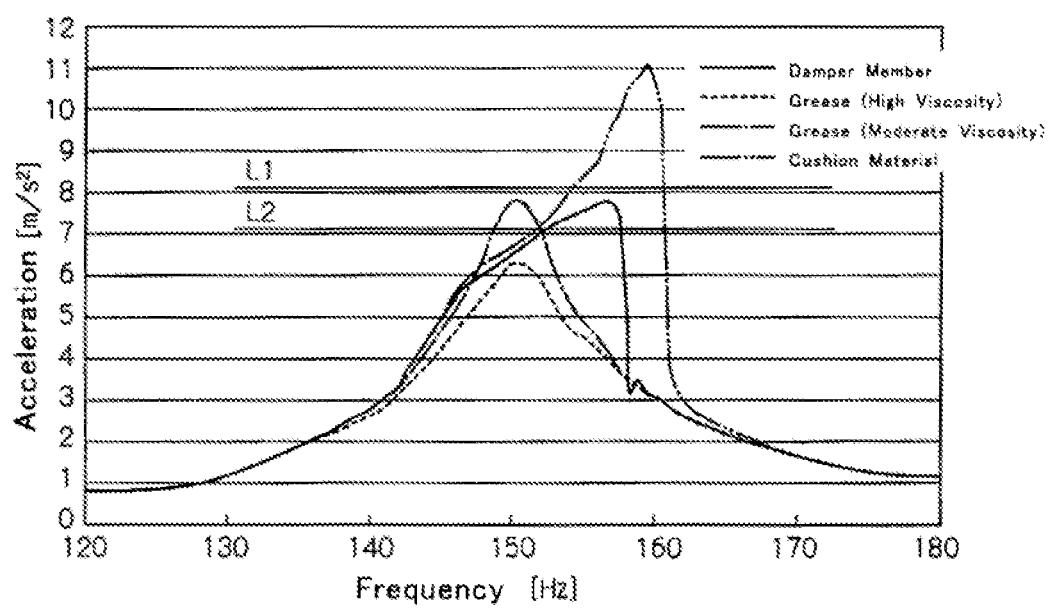
FIG. 6 is a graph representing the relationship between the frequency and the acceleration of a vibrating body in case where a damper member and other means for preventing undue vibration are used.
Figure 7:
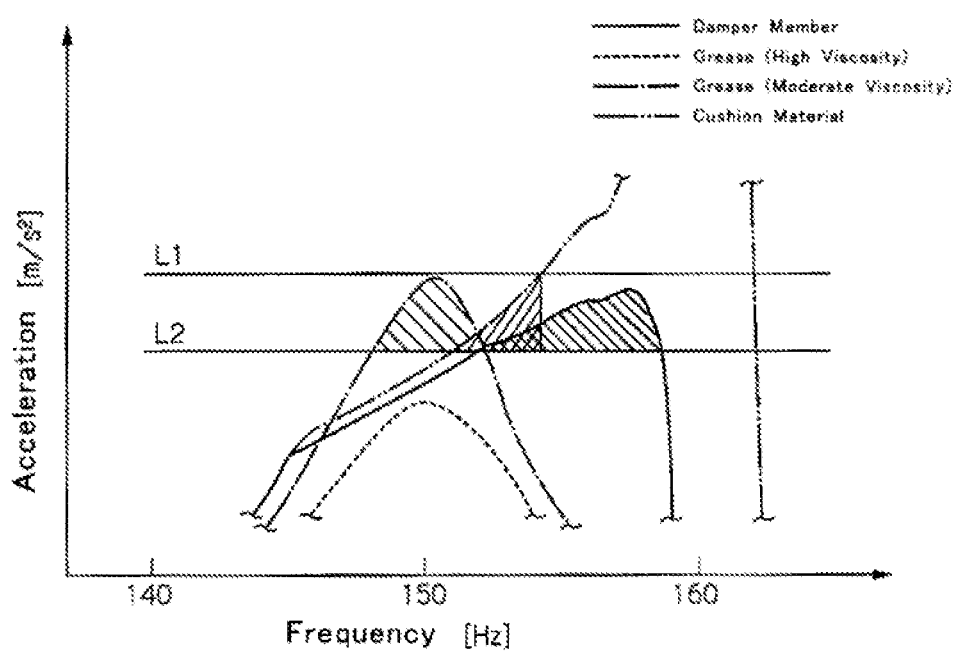
FIG. 7 is a graph representing the relationship between the frequency and the acceleration of a vibrating body in an effectively usable frequency range in case where a damper member and other means for preventing undue vibration are used.

FIGS. 6 and 7 are graphs representing the relationship between the frequency and the acceleration of the vibrating body 30 in case where the undue vibration of the vibrating body 30 is prevented by other means than the damper members 70 and in case where undue vibration of the vibrating body 30 is prevented by the damper members 70.

In the graph shown in FIG. 6, the horizontal axis indicates the frequency. The vertical axis indicates the acceleration. The solid-line curve indicates the case where the damper members 70 are arranged. The dot-line curve indicates the case where high-viscosity grease is filled. The single-dot-chain-line curve indicates the case where moderate-viscosity grease is filled. The double-dot-chain-line curve indicates the case where cushion materials such as rubber or the like are attached to the vibration direction opposite sides of the vibrating body 30.

In case where the damper members 70 are arranged, as stated above, the acceleration exists in the proper region if the frequency falls within a wide frequency region between a value of a little larger than 150 Hz and a value of a little smaller than 160 Hz.

In case where high-viscosity grease is filled, the acceleration fails to reach even the lower limit L2. The peak of the acceleration reaches 6 m/s$^2$ at most. In case where moderate-viscosity grease is filled, the acceleration exists in the proper region if the frequency is around 150 Hz. It can be seen that the peak of the acceleration at the resonance point reaches a value smaller than the upper limit L1 at most. Since the viscosity of grease is changed depending on the temperature, there is a problem in that the acceleration falls within the proper region or fails to fall within the proper region depending on the temperature of the vibration generator 1A. Another problem exists in that, if grease is scattered along with the vibration of the vibrating body 30, the Q value undergoes a change.

In case where the cushion materials are used, the resonance point can be changed from about 150 Hz to about 160 Hz. The acceleration exceeds the lower limit L2 and enters the proper region if the frequency becomes larger than 150 Hz. However, the acceleration exceeds the upper limit L1 if the frequency has a substantially middle value between 150 Hz and 160 Hz. The acceleration reaches a peak at about 160 Hz. The acceleration is sharply reduced to below the upper limit L1 and then to below the lower limit L2 if the frequency becomes larger than 160 Hz.

In case where the cushion materials are used, if the vibrating body 30 reaches about a maximum amplitude, the cushion materials collide with the circumferential wall portion 13 of the housing 10. Thus, the vibration of the vibrating body 30 is forcibly restrained. For that reason, it is possible to prevent the vibrating body 30 from interfering with the circumferential wall portion 13 of the housing 10 and to prevent generation of noises otherwise generated by the interference of the vibrating body 30 with the circumferential wall portion 13 of the housing 10. However, the cushion materials such as rubber or the like are degraded over time. If the cushion materials are degraded, the vibrating body 30 interferes with the degraded cushion materials, thereby generating additional noises.

Next, the frequency range in which the acceleration exists within the proper region will be described with reference to FIG. 7.

In case where the damper members 70 are used, as set forth above, it is possible to have the acceleration stay within the proper region over a wide frequency region. In case where high-viscosity grease is filled, it is impossible to have the acceleration reach the proper region. In case where moderate-viscosity grease is filled, it is possible to have the acceleration stay within the proper region over a relatively-wide frequency region. However, as stated above, there is a problem in that the viscosity of grease is changed depending on the temperature. There is another problem in that grease is scattered along with the vibration of the vibrating body 30. In case where the cushion materials are used, the acceleration exists within the proper region only in a narrow frequency region of 150 Hz or more and in an extremely-narrow frequency region around 160 Hz.

In view of the aforementioned phenomena and in terms of the frequency range in which the acceleration stays within the proper region, it can be noted that the damper members 70 are superior to other means as a means for preventing undue vibration of the vibrating body 30.

The respective components described above can be assembled by capping the case 12 on the bottom member 11 in a state the coil 20 is held by the coil holder 15 of the bottom member 11 and that the vibrating body 30 is supported on the circumferential wall portion 13 of the case 12 by the leaf springs 50. In the state that the respective components are assembled together, a specified clearance exists between the upper surface of the coil 20 and the lower surface of the vibrating body 30 as shown in FIG. 2. In addition, a specified clearance exists between the upper surface of the vibrating body 30 and the top portion 14 of the case 12.

In the vibration generator 1A described above, the coil 20 generates magnetic fields if an electric current flows through the coil 20. The vibrating body 30 is reciprocatingly vibrated in the longitudinal direction of the vibrating body 30 by virtue of the interaction of the magnetic fields generated by the coil 20 and the magnetic fields generated by the magnets 35 of the vibrating body 30. Since the vibrating body 30 is supported by the leaf springs 50 between the coil 20 and the top portion 14 of the case 12, it is possible for the vibrating body 30 to make smooth reciprocating vibration. At this time, the damper members 70 make the vibration characteristics of the leaf springs 50 non-linear, thereby preventing undue vibration of the vibrating body 30.

In the vibration generator 1A according to the first preferred embodiment, the base portions 71 of the damper members 70 are attached to the vibrating body 30. The tip end portions 72 of the damper members 70 make sliding contact with the leaf springs 50. Alternatively, the damper members 70 may be configured such that the base portions 71 thereof are fixed to the leaf springs 50 and the tip end portions 72 thereof make sliding contact with the vibrating body 30.

Second Preferred Embodiment

In the second preferred embodiment, the vibration generator 1B preferably includes damper members 80 differing in configuration from the damper members 70 of the first preferred embodiment. The vibration generator 1B of the second preferred embodiment remains the same as the vibration generator 1A of the first preferred embodiment in terms of the configurations other than the damper members 80. Therefore, the configurations of the vibration generator 1B of the second preferred embodiment remaining the same as those of the vibration generator 1A of the first preferred embodiment will be designated by like reference symbols and will be described only briefly. Detailed description will be made on only the differing configurations.

Figure 8:
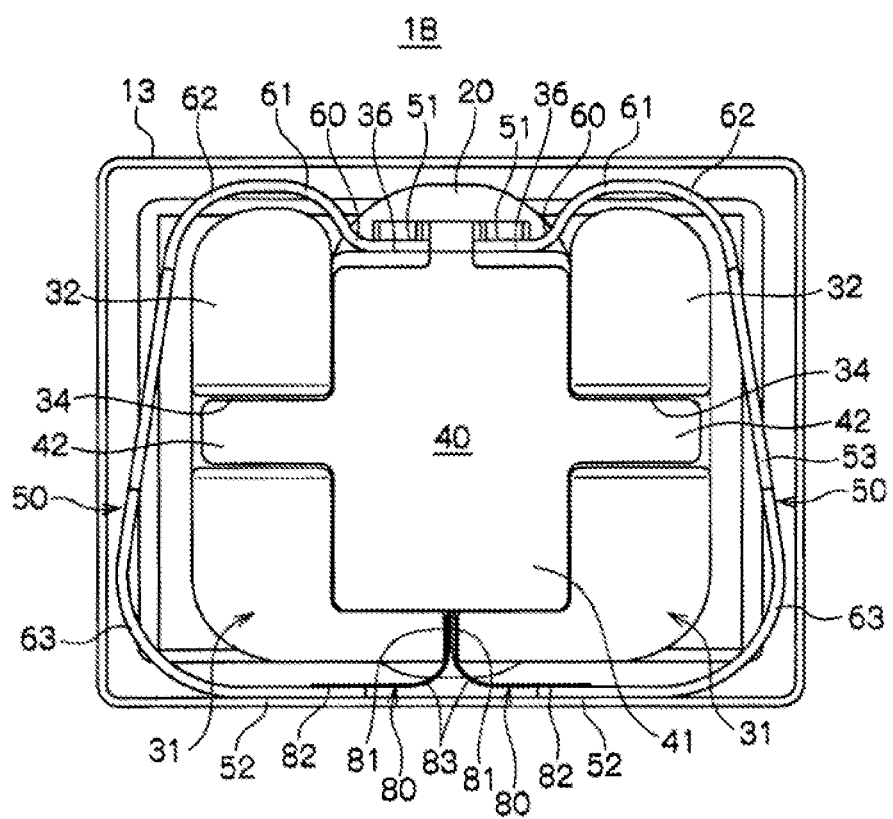
FIG. 8 is a plan view showing the internal structure of a vibration generator according to a second preferred embodiment of the present invention.
Figure 9:
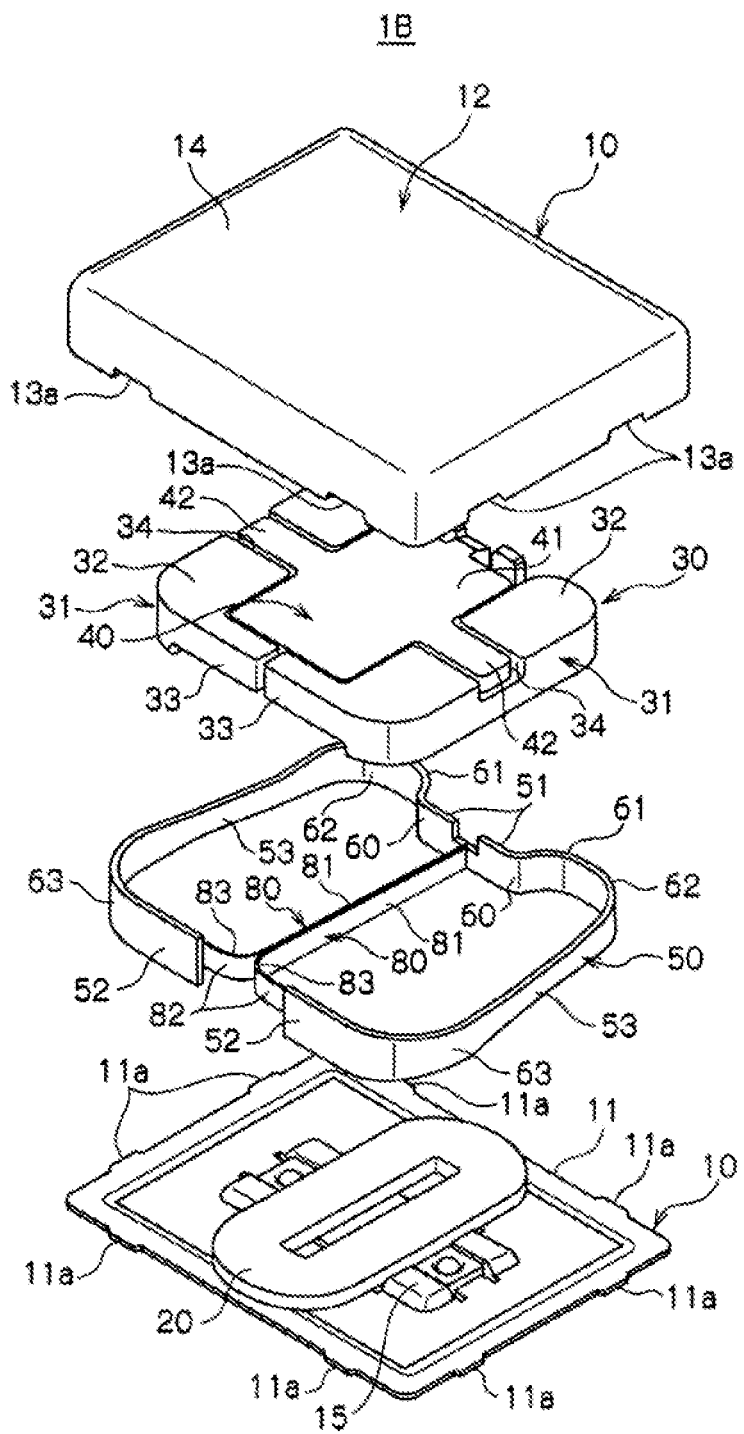
FIG. 9 is an exploded perspective view of the vibration generator shown in FIG. 8.

As shown in FIGS. 8 and 9, the vibration generator 1B of the second preferred embodiment preferably includes a housing 10 making up an outer shell of the vibration generator 1B. The housing 10 is made of a non-magnetic material and is small in height. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is attached to the bottom member 11. A vibrating body 30 is arranged within the housing 10 in an opposing relationship with the coil 20. Leaf springs 50 for supporting the vibrating body 30 with respect to the circumferential wall portion 13 of the case 12 are arranged within the housing 10.

The coil 20 is a hollow-core spiral coil and is arranged on the bottom member 11 of the housing 10. The vibrating body 30 is a vibrating body reciprocatingly vibrating within a plane parallel to the bottom member 11. The vibrating body 30 is formed to have, e.g., a rectangular contour or a substantially rectangular contour. The vibrating body 30 preferably includes a pair of weights 31 arranged at the longitudinal opposite sides of the vibrating body 30, a pair of magnets 35 arranged between the weights 31 and a cover 40 covering the magnets 35 from above. The weights 31, the magnets 35 and the cover 40 are one-piece formed with one another.

Each of the weights 31 is formed into a substantially L-like shape by a lateral weight portion 32 and a central weight portion 33. The respective weights 31 are arranged in a symmetrical relationship. The tip ends of the central weight portions 33 are opposed to each other with a specified clearance left therebetween. The lateral weight portion 32 has a fitting groove 34.

Each of the magnets 35 is formed into, e.g., a rectangular parallelepiped shape. The magnets 35 are arranged between the weights 31 with the longitudinal direction thereof oriented in the transverse direction of the vibrating body 30. The magnets 35 are arranged in a symmetrical relationship. A specified clearance is defined between the magnets 35. The base portions 81 of the damper members 80 to be described later are inserted into the clearance.

The cover 40 is made of a magnetic material. The cover 40 preferably includes a body portion 41 covering the region between the weights 31 from above. The cover 40 preferably further includes arm portions 42 extending outward from the left and right sides of the body portion 41. The arm portions 42 are fitted to the fitting grooves 34 of the respective weights 31.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the longitudinal center of the vibrating body 30 in a symmetrical relationship with respect to the longitudinal center of the vibrating body 30.

The leaf springs 50 are arranged at the opposite sides of the vibrating body 30 in the vibration direction of the vibrating body 30 and are positioned between the vibrating body 30 and the circumferential wall portion 13 of the case 12, thereby supporting the vibrating body 30 on the circumferential wall portion 13. Each of the leaf springs 50 preferably includes a connection portion 51 connected to the vibrating body 30, an attachment portion 52 attached to the circumferential wall portion 13 and an intermediate portion 53 formed between the connection portion 51 and the attachment portion 52 to extend around the vibrating body 30. The connection portion 51 and the attachment portion 52 of each of the leaf springs 50 are arranged along a direction intersecting the vibration direction of the vibrating body 30. The connection portion 51 and the attachment portion 52 of each of the leaf springs 50 are arranged at one transverse side and the other transverse side of the vibrating body 30 interposed therebetween. The connection portion 51 is connected to the vibrating body 30 at one transverse side of the vibrating body 30. The attachment portion 52 is attached to the circumferential wall portion 13 of the case 12 at the other transverse side of the vibrating body 30.

The leaf springs 50 arranged at the longitudinal opposite sides of the vibrating body 30 may be formed into an one-piece member.

The damper members 80 are arranged between the leaf springs 50 and the vibrating body 30. The damper members 80 are band-shaped members made of a resin or the like. Each of the damper members 80 preferably includes a linearly-extending base portion 81 and a linearly-extending tip end portion 82 formed at a right angle or at a substantially right angle with respect to the base portion 81. Each of the damper members 80 preferably further includes an arc-like curved portion 83 which can interconnect the base portion 81 and the tip end portion 82.

The damper members 80 are arranged in pair in a corresponding relationship with the leaf springs 50 arranged at the longitudinal opposite sides of the vibrating body 30. The damper members 80 are held by the vibrating body 30 with the base portions 81 thereof inserted between the magnets 35 of the vibrating body 30. The tip end portions 82 of the damper members 80 are arranged at the other transverse side of the vibrating body 30 at which the attachment portions 52 of the leaf springs 50 are positioned. The tip end portions 82 of the damper members 80 protrude from the vibrating body 30 toward the attachment portions 52 of the leaf springs 50. In the root region in which the damper members 80 protrude from the vibrating body 30, the base portions 81 are inserted into the clearance defined between the tip ends of the central weight portions 33 and are held between the weights 31.

The tip end portions 82 extend outward in the vibration direction from the longitudinal center of the vibrating body 30. The outer surfaces of the tip end portions 82 make contact with the inner surfaces of the attachment portions 52 of the leaf springs 50. The tip end portions 82 are biased toward the attachment portions 52 with weak forces.

Along with the reciprocating vibration of the vibrating body 30, the damper members 80 vibrate together with the vibrating body 30. The tip end portions 82 make sliding contact with the attachment portions 52 of the leaf springs 50. The damper members 80 are made of a resin or the like. It is therefore possible to reduce the frictional forces generated between the tip end portions 82 and the attachment portions 52 when the tip end portions 82 make sliding contact with the attachment portions 52. Since the frictional forces generated between the damper members 80 and the attachment portions 52 are small, the damper members 80 do not adversely affect the vibration of the vibrating body 30 when the vibrating body 30 makes vibration. In the meantime, the damper members 80 can stop the vibrating body 30 within a short period of time when an electric current flowing through the coil 20 is cut off to stop the vibration of the vibrating body 30.

As another means for stopping the vibration of the vibrating body 30, there is conventionally available a means that fills grease or magnetic fluid and stops the vibrating body 30 through the use of the resistance thereof. However, the means employing grease or magnetic fluid suffers from a problem in that the grease or the magnetic fluid is scattered within the housing 10 along with the vibration of the vibrating body 30, thereby changing the Q value. Since the viscosity of grease or magnetic fluid is changed depending on the temperature, another problem is posed in that the action of stopping the vibrating body 30 is changed depending on the temperature.

Inasmuch as the damper members 80 are made of a resin or the like, it is possible for the damper members 80 to rapidly stop the vibrating body 30 without changing the Q value. The damper members 80 can promise a specific effect that the action of stopping the vibrating body 30 is hardly changed by the temperature change.

In the vibration generator 1B according to the second preferred embodiment, the base portions 81 of the damper members 80 are attached to the vibrating body 30. The tip end portions 82 of the damper members 80 extend toward the attachment portions 52 of the leaf springs 50. Alternatively, the base portions 81 may be attached to the attachment portions 52. The tip end portions 82 may be caused to extend toward the vibrating body 30 so that the tip end portions 82 can make sliding contact with the side surface of the vibrating body 30.

In the subject specification, the vibration generator 1A provided with the damper members 70 and the vibration generator 1B provided with the damper members 80 have been described independently of each other. However, it may be possible to form a vibration generator provided with both the damper members 70 and the damper members 80.

What is claimed is:

1. A vibration generator, comprising:
a circumferential wall portion;
a vibrating body arranged inside the circumferential wall portion in an opposing relationship with a coil and configured to reciprocatingly vibrate in one direction;
a band-shaped leaf spring arranged between the vibrating body and the circumferential wall portion to support the vibrating body on the circumferential wall portion; and
a damper member including a base portion attached to one of the vibrating body and the leaf spring and a tip end portion extending toward the other of the vibrating body and the leaf spring,
wherein the tip end portion of the damper member makes sliding contact with the leaf spring or the vibrating body.

2. The vibration generator of claim 1, wherein a contact area of the tip end portion of the damper member and the leaf spring or the vibrating body varies with movement of the vibrating body.

3. The vibration generator of claim 1, wherein the leaf spring includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body;
the connection portion and the attachment portion are arranged to interpose the vibrating body therebetween in a direction intersecting a vibration direction of the vibrating body, the connection portion being arranged at one transverse side of the vibrating body, the attachment portion being arranged at the other transverse side of the vibrating body;
the intermediate portion is arranged outward of the vibrating body in the vibration direction to extend across the vibration direction; and
the damper member is arranged between a side portion of the vibrating body positioned at the other transverse side of the vibrating body and the intermediate portion of the leaf spring.

4. The vibration generator of claim 2, wherein the leaf spring includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body;
the connection portion and the attachment portion are arranged to interpose the vibrating body therebetween in a direction intersecting a vibration direction of the vibrating body, the connection portion being arranged at one transverse side of the vibrating body, the attachment portion being arranged at the other transverse side of the vibrating body;
the intermediate portion is arranged outward of the vibrating body in the vibration direction to extend across the vibration direction; and
the damper member is arranged between a side portion of the vibrating body positioned at the other transverse side of the vibrating body and the intermediate portion of the leaf spring.

5. The vibration generator of claim 1, wherein the leaf spring is converted to a non-linear characteristic spring by the damper member.

6. The vibration generator of claim 2, wherein the leaf spring is converted to a non-linear characteristic spring by the damper member.

7. The vibration generator of claim 5, wherein the leaf spring is made of a metallic material, the vibrating body being configured to vibrate at a frequency close to a resonance frequency of the leaf spring, the damper member having a spring constant smaller than a spring constant of the leaf spring.

8. The vibration generator of claim 6, wherein the leaf spring is made of a metallic material, the vibrating body being configured to vibrate at a frequency close to a resonance frequency of the leaf spring, the damper member having a spring constant smaller than a spring constant of the leaf spring.

9. The vibration generator of claim 5, wherein the damper member has a resonance frequency equal to or smaller than $\frac{1}{10}$ of a resonance frequency of the leaf spring.

10. The vibration generator of claim 6, wherein the damper member has a resonance frequency equal to or smaller than $\frac{1}{10}$ of a resonance frequency of the leaf spring.

11. The vibration generator of claim 1, wherein the leaf spring includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body;

the connection portion and the attachment portion are arranged to interpose the vibrating body therebetween in a direction intersecting a vibration direction of the vibrating body, the connection portion being arranged at one transverse side of the vibrating body, the attachment portion being arranged at the other transverse side of the vibrating body;

the intermediate portion is arranged outward of the vibrating body in the vibration direction to extend across the vibration direction; and the base portion of the damper member is attached to the vibrating body, the tip end portion of the damper member extending toward an inner surface of the attachment portion of the leaf spring.

* * * * *